(12) United States Patent
Uchimura et al.

(10) Patent No.: US 11,947,014 B2
(45) Date of Patent: Apr. 2, 2024

(54) PASSENGER MONITORING SYSTEM AND METHOD

(71) Applicants: NEC Corporation, Tokyo (JP); NEC Platforms, Ltd., Kawasaki (JP)

(72) Inventors: Jun Uchimura, Tokyo (JP); Hiroshi Takahashi, Kanagawa (JP)

(73) Assignees: NEC CORPORATION, Tokyo (JP); NEC Platforms, Ltd., Kanagawa (JP)

(*) Notice: Subject to any disclaimer, the term of this patent is extended or adjusted under 35 U.S.C. 154(b) by 410 days.

(21) Appl. No.: 17/294,505

(22) PCT Filed: Nov. 19, 2019

(86) PCT No.: PCT/JP2019/045219
§ 371 (c)(1),
(2) Date: May 17, 2021

(87) PCT Pub. No.: WO2020/105618
PCT Pub. Date: May 28, 2020

(65) Prior Publication Data
US 2021/0405195 A1    Dec. 30, 2021

(30) Foreign Application Priority Data
Nov. 20, 2018  (JP) .................. 2018-217053

(51) Int. Cl.
*G01S 17/48* (2006.01)
*B61L 15/00* (2006.01)
(Continued)

(52) U.S. Cl.
CPC .......... *G01S 17/48* (2013.01); *B61L 15/0072* (2013.01); *G01S 7/4802* (2013.01); *G01S 7/4804* (2013.01); *G01S 7/4808* (2013.01); *G01S 17/894* (2020.01)

(58) Field of Classification Search
CPC ........ G01S 17/88; G01S 17/48; G01S 17/894; G01S 7/4808; G01S 7/481; G01S 7/4802;
(Continued)

(56) References Cited

U.S. PATENT DOCUMENTS 6,819,994 B2 * 11/2004 Shinohara ........... F16H 61/0251
                                                      701/1
2003/0230879 A1 * 12/2003 Konda .............. B60R 21/01534
                                                      280/735
(Continued)

FOREIGN PATENT DOCUMENTS

CN           1516050 A      7/2004
CN         103824348 A      5/2014
(Continued)

OTHER PUBLICATIONS

Hayamizu et al."Image Capture Device, Signal Processing Device, and Vehicle Control System", Mar. 22, 2018, WO 2018051816 A1 (Year: 2018).*

(Continued)

*Primary Examiner* — Sang H Nguyen

(57) ABSTRACT

Provided is a passenger monitoring system comprising: a ranging sensor that is provided in a vehicle and capable of outputting a distance information corresponding to a distance to a passenger in the vehicle; and a control unit that estimates a state of congestion of the vehicle based on the distance information.

9 Claims, 14 Drawing Sheets

(51) Int. Cl.
*G01S 7/48* (2006.01)
*G01S 17/894* (2020.01)

(58) Field of Classification Search
CPC .......... G01S 7/4804; G01S 7/48; B61L 25/02; B61L 15/0072; B61L 27/57
See application file for complete search history.

(56) References Cited

U.S. PATENT DOCUMENTS

| | | | |
|---|---|---|---|
| 2015/0175162 A1* | 6/2015 | Nakadori | B60W 30/16 701/96 |
| 2015/0358610 A1* | 12/2015 | Takahashi | H04N 13/128 348/47 |
| 2018/0259967 A1* | 9/2018 | Frazzoli | B60W 30/095 |
| 2021/0306554 A1* | 9/2021 | Nose | G06T 7/66 |

FOREIGN PATENT DOCUMENTS

| | | |
|---|---|---|
| JP | H11291909 A | 10/1999 |
| JP | 2001328534 A | 11/2001 |
| JP | 2006151533 A | 6/2006 |
| JP | 2006208076 A | 8/2006 |
| JP | 2007102341 A | 4/2007 |
| JP | 2008174106 A | 7/2008 |
| JP | 2010132444 A | 6/2010 |
| JP | 2012056535 A | 3/2012 |
| JP | 2013025523 A | 2/2013 |
| JP | 2016062414 A | 4/2016 |
| JP | 2016063455 A | 4/2016 |
| JP | 2017144989 A | 8/2017 |
| WO | 2011/144458 A1 | 11/2011 |

OTHER PUBLICATIONS

Hashimoto "Vehicle Crowded State Guide Device", Oct. 26, 1999, JP H11291909 A (Year: 1999).*
JP 5898921 B2 "Sensing Device and The Detection Method for a Vehicle Door Opening and Closing", Apr. 6, 2016 (Year: 2016).*
CN Office Action for CN Application No. 201980076241.5, dated Jul. 20, 2022 with English Translation.
Chen Jingjing, "Characteristics and Application of Passenger Flow Monitoring Technology in Urban Rail Transit Network", Urban Mass Transit, 2018, pp. 137-142.
International Search Report of PCT Application No. PCT/JP2019/045219 dated Feb. 25, 2020.
English translation of Written opinion for PCT Application No. PCT/JP2019/045219, dated Feb. 25, 2020.

* cited by examiner

PASSENGER MONITORING SYSTEM AND METHOD

This application is a National Stage Entry of PCT/JP2019/045219 filed on Nov. 19, 2019, which claims priority from Japanese Patent Application 2018-217053 filed on Nov. 20, 2018, the contents of all of which are incorporated herein by reference, in their entirety.

TECHNICAL FIELD

The present invention relates to a passenger monitoring system and method.

BACKGROUND ART

Patent Literature 1 discloses a guide device of a state of congestion that informs a user of a state of congestion in a train. The guide device of the state of congestion has a light generating unit that generates a laser beam and a deflection unit that deflects the laser beam in a two-dimensional direction. The guide device of the state of congestion receives a light signal and counts the received light signal as the number of passengers.

CITATION LIST

Patent Literature

PTL 1: Japanese Patent Application Laid-open No. H11-291909

SUMMARY OF INVENTION

Technical Problem

However, Patent Literature 1 does not disclose specific configuration and method for counting passengers from the received light signal in the guide device of the state of congestion. Therefore, the guide device of the state of congestion in Patent Literature 1 cannot accurately detect the state of congestion in the train Solution to Problem According to one example aspect of the present invention, provided is a passenger monitoring system comprising: a ranging sensor that is provided in a vehicle and capable of outputting a distance information corresponding to a distance to a passenger in the vehicle; and a control unit that estimates a state of congestion of the vehicle based on the distance information.

According to another example aspect of the present invention, provided is a passenger monitoring method comprising: obtaining step to obtain a distance information corresponding to a distance to a passenger in a vehicle from a ranging sensor provided in the vehicle; and estimating step to estimate a state of congestion of the vehicle based on the distance information.

Advantageous Effects of Invention

According to the present invention, a passenger monitoring system can achieve to detect accurately the state of congestion in the train.

BRIEF DESCRIPTION OF DRAWINGS

FIG. 12A is a diagram illustrating one example of a screen displayed on the user terminal according to the first example embodiment.

FIG. 12A is a diagram illustrating one example of a screen displayed on the user terminal according to the first example embodiment.

DESCRIPTION OF EMBODIMENTS

Exemplary example embodiments of the present invention will be described below with reference to the drawings.

First Example Embodiment

A passenger monitoring system of the present embodiment can monitor the state of congestion in vehicles such as trains, buses, and streetcars, for example. Here, passengers are assumed to include belongings such as luggage and carts carried by the passengers. The following is an example of the application of the passenger monitoring system to the train.

Figure 1:
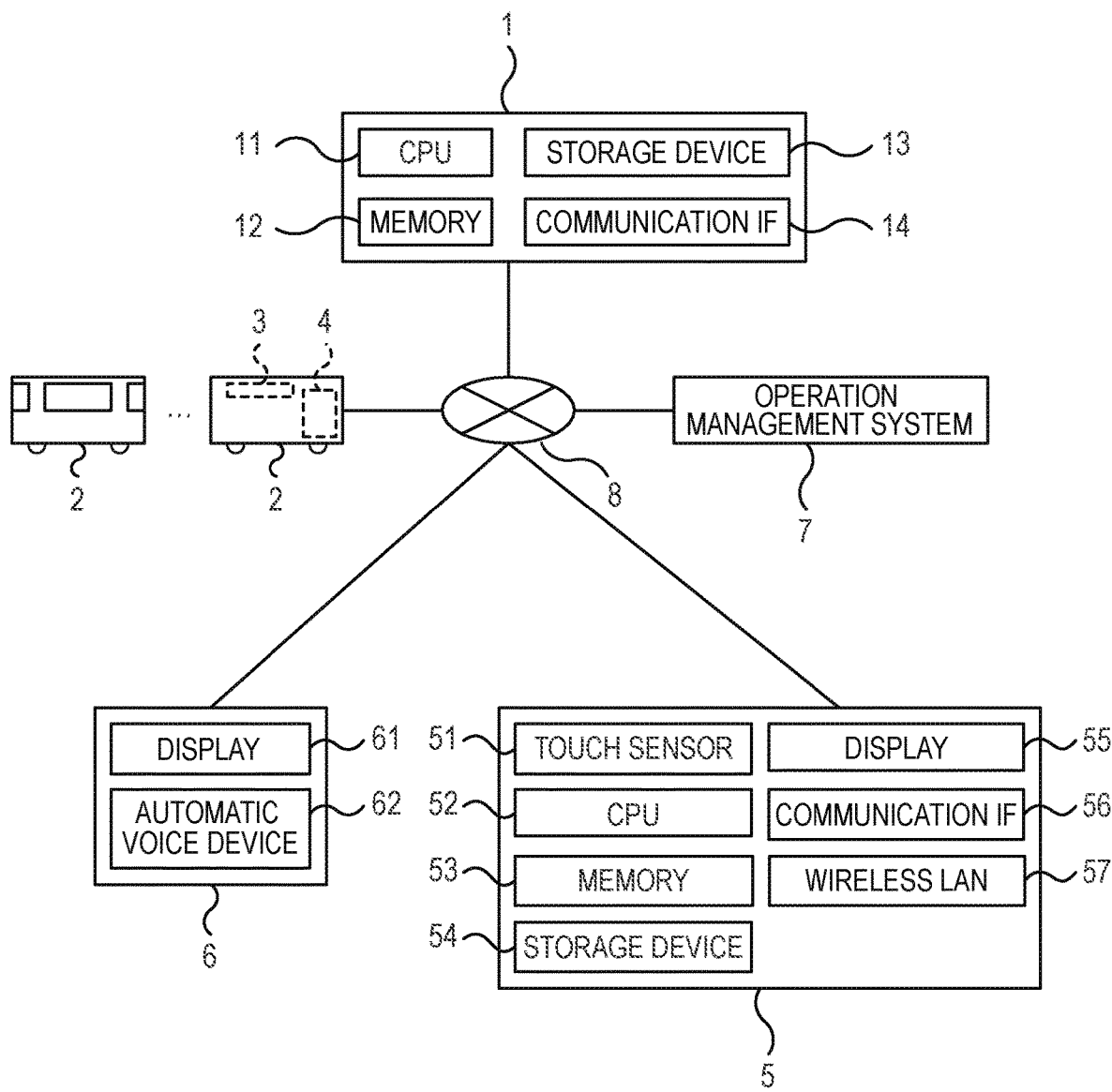
FIG. 1 is a block diagram of a passenger monitoring system according to a first example embodiment.

FIG. 1 is a block diagram of a passenger monitoring system according to the present example embodiment. The passenger monitoring system includes a server 1, a ranging sensor 3 provided in a vehicle 2, and a control unit 4 for counting passengers based on a signal of the ranging sensor 3. The passenger monitoring system can be connected to a user terminal 5, a station yard terminal 6, and an operation management system 7 via a network 8. While FIG. 1 illustrates only one ranging sensor 3, control unit 4, user terminal 5, and station yard terminal 6, a plurality of ranging sensors 3, control units 4, user terminals 5, and station yard terminals 6 may be provided depending on the number of vehicles, the number of platforms, the number of trains, and the like.

The vehicle 2 is a part of train carriages, and the vehicle 2 is provided with the ranging sensor 3 and the control unit 4. The ranging sensor 3 can output distance information representing the distance from the ranging sensor 3 to the object. The ranging sensor 3 may be a LiDAR (Light Detection and Ranging) device, for example. The ranging sensor 3 can obtain the distance information to the passenger by scanning the inside of the vehicle 2. The control unit 4 can estimate the number of passengers based on the distance information from the ranging sensor 3, and transmit information such as the number of passengers for each vehicle 2 to the server 1.

The server 1 is a so-called cloud server, and includes a CPU (Central Processing Unit) 11, a memory 12, a storage device 13, and a communication IF (Interface) 14. The server 1 determines the state of congestion in the vehicle 2 based on the information such as the number of passengers transmitted from the vehicle 2.

The user terminal 5 is, for example, a portable terminal such as a smartphone. The user terminal 5 includes a touch sensor 51, a CPU 52, a memory 53, a storage device 54, a display 55, a communication IF 56, and a wireless LAN 57. The memory 53 and the storage device 54 previously store an application program downloaded via the network 8. The CPU 52 executes the application program and displays the state of congestion on a display 55. For example, when the user operates the application program via the touch sensor 51, the server 1 is requested transmitting the state of congestion in the train. When receiving the request from the user terminal 5, the server 1 transmits the state of congestion in the vehicle 2 to the user terminal 5 via the network 8. The user terminal 5 receives the state of congestion in the vehicle 2 from the server 1 and displays it on a display 55. The user terminal 5 may automatically receive the state of congestion from the server 1.

The station yard terminal 6 includes a display 61 and an automatic voice device 62, and is installed, for example, in a platform of a station of a conventional line or a subway. The display 61 is a large display device such as a signage, an electric bulletin board, etc. The automatic voice device 62 includes a voice synthesizing device and a speaker for automatically speaking the state of congestion. When receiving the state of congestion transmitted from the server 1, the station yard terminal 6 displays the state of congestion on a display 61 and broadcasts the state of congestion from an automatic voice device 62. In this way, the user waiting for the arrival of the train in the station yard can know the state of congestion of each vehicle in the train.

The operation management system 7 includes a plurality of computers, and automatically manages operations of a plurality of trains on a route according to a predetermined operation program (timetable). Further, the operation management system 7 receives the state of congestion of each vehicle from the server 1, and can refer to the state of congestion for the operation command such as the prediction of the delay time of the train in response to the state of congestion.

Figure 2:
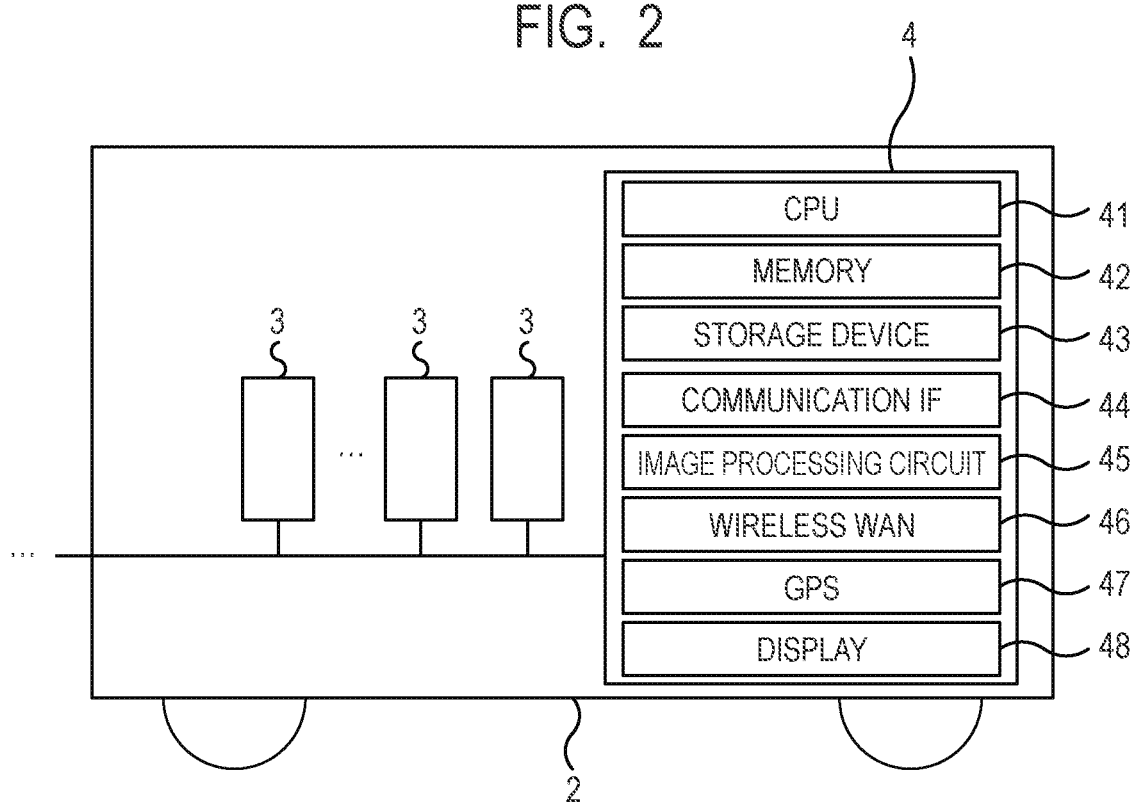
FIG. 2 is a block diagram of a control unit and a ranging sensor according to the first example embodiment.

FIG. 2 is a block diagram of the control unit and the ranging sensor according to the present example embodiment. The control unit 4 is provided in any vehicle 2 of the train and can be installed in a head vehicle, a tail vehicle, or any vehicle. The control unit 4 has a train ID for identifying the train. The control unit 4 may be connected to a plurality of ranging sensors 3 provided in each vehicle 2. In this case, the control unit 4 can estimate the number of passengers for each vehicle 2 by storing the position information of the vehicle 2 provided with the ranging sensor 3. The control unit 4 may be provided in each vehicle 2. In this case, each control unit 4 may have the same train ID and an identification code for each vehicle 2.

The control unit 4 includes a CPU 41, a memory 42, a storage device 43, a communication IF 44, an image processing circuit 45, a wireless WAN 46, a GPS (Global Positioning System) 47, and a display 48. The CPU 41 recognizes passengers and estimates the number of passengers based on distance information from the ranging sensor 3 according to programs stored in the memory 42 and the storage device 43. The communication IF 44 is, for example, a serial communication interface and can input distance information from a plurality of ranging sensors 3.

The image processing circuit 45 comprises a GPU (Graphics Processing Unit) or the like, and performs the image processing necessary for detecting the number of passengers in the distance information from the ranging sensor 3. The image processing may include, for example, edge detection, feature quantity extraction, pattern matching, machine learning calculations based on neural networks, statistical calculations, and the like.

The wireless WAN 46 is a communication interface connectable to a wireless communication line and is used to communicate with the server 1. The wireless communication line may be a public radio communication line in addition to a radio communication line dedicated to trains. The wireless WAN 46 is used to transmit distance information from the ranging sensor 3, the number of passengers of each vehicle 2, and the position information of the train to the server 1. The GPS 47 is used to obtain position information of the train. The position information of the train may be obtained by a track circuit provided in each predetermined section of the track, or may be calculated based on the rotational speed of the axle of the train.

One or more ranging sensors 3 are provided in each vehicle 2 and connected to the control unit 4 via a communication IF 44. Each vehicle 2 is provided with one or more ranging sensors 3. Note that the ranging sensor 3 is not necessarily provided in each vehicle 2, and the ranging sensor 3 may be provided only in some of the vehicles 2. In this case, the control unit 4 can use the number of passengers in the vehicle 2 provided with the ranging sensor 3 to estimate the state of congestion in the vehicle 2 not provided with the ranging sensor 3.

Figure 3:
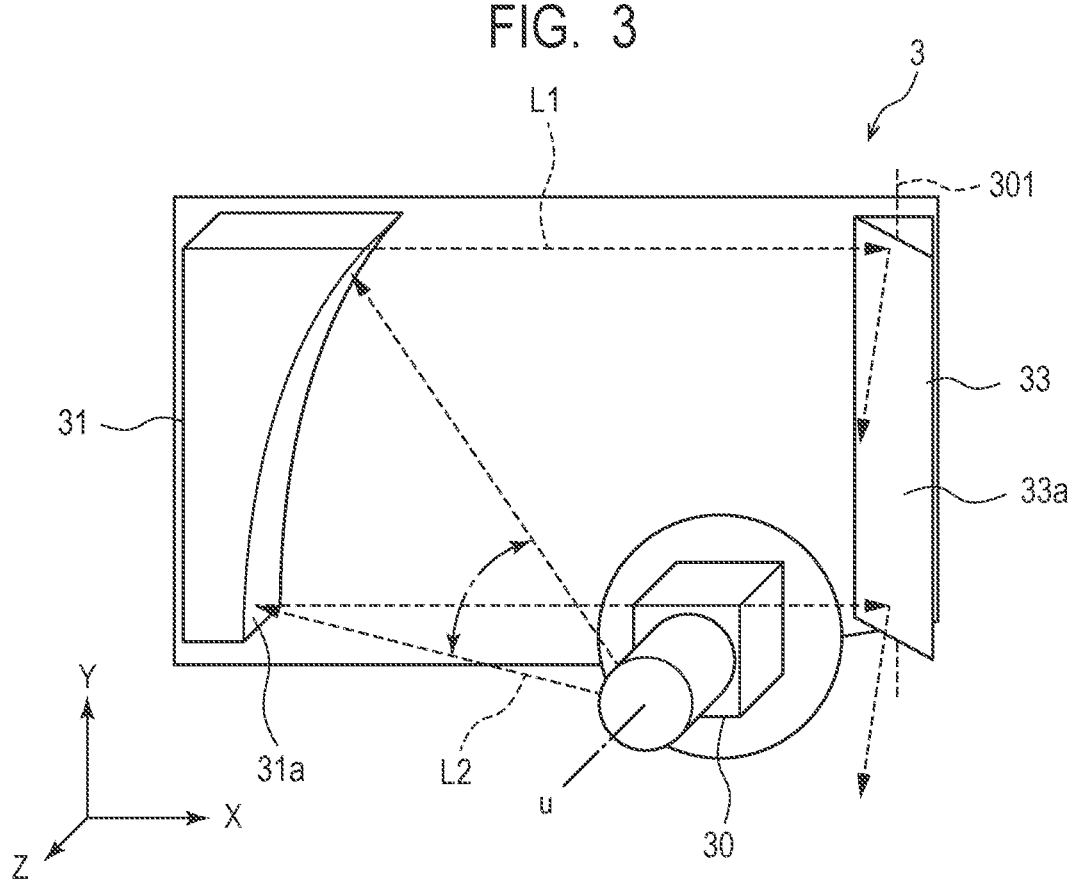
FIG. 3 is a schematic perspective view illustrating the ranging sensor according to the first example embodiment.
Figure 4:
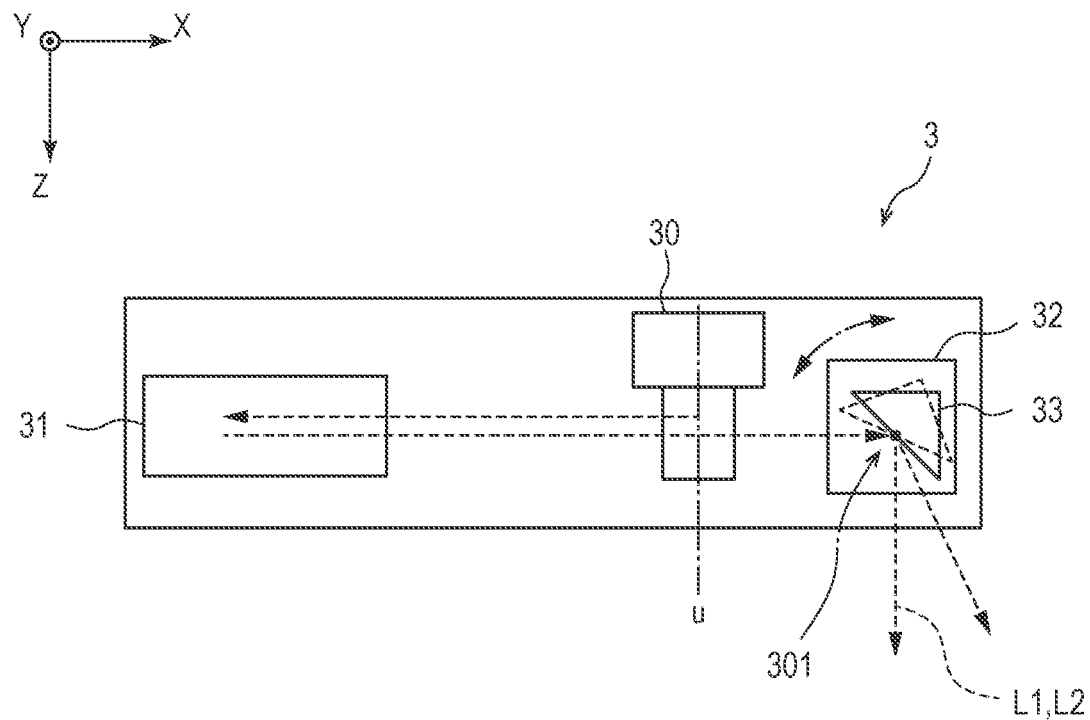
FIG. 4 is a schematic top view illustrating the ranging sensor according to the first example embodiment.

FIG. 3 is a schematic perspective view illustrating the ranging sensor 3 according to the present example embodiment. FIG. 4 is a schematic top view illustrating the structure of the ranging sensor 3. The structure of the ranging sensor 3 will be described with reference to these figures.

The ranging sensor 3 is a LiDAR and can obtain distance information from the ranging sensor 3 to the object. The ranging sensor 3 includes a sensor unit 30, a parabolic reflector 31, a driving mechanism 32, and a planar reflector 33.

As shown in FIG. 3, the sensor unit 30 can perform rotational scanning around the rotational axis u. The sensor unit 30 includes a laser device emitting laser light and a photoelectric conversion element receiving the reflected light reflected by the object and converting the reflected light into an electric signal. As shown in FIG. 3, the sensor unit 30 is disposed below the ranging sensor 3. Light emitted from the sensor unit 30 is incident on the reflecting surface 31a of the parabolic reflector 31.

As an example of the ranging method by the sensor unit 30, a time of flight (TOF) method can be used. The TOF method is a method of ranging the distance by measuring the time from when the light is emitted to when the reflected light is received. The laser light (measurement light) emitted from the sensor unit 30 may be visible light, or may be invisible light such as infrared light. It is desirable that the laser light is invisible light so as not to cause discomfort to passengers. For example, the laser light may be infrared with a wavelength of 905 nm.

The parabolic reflector 31 is a reflector having the reflecting surface 31a. The reflecting surface 31a is formed as parabola with a point on the rotational axis u as the focal point in a cross section perpendicular to the rotational axis u (XY plane in FIG. 3). That is, the sensor unit 30 is disposed near the focal point of the parabola formed by the reflecting surface 31a, and the rotational axis u is disposed at a position passing through the focal point of the parabola formed by the reflecting surface 31a. The rotational axis u is parallel to the Z axis in FIG. 3. The equation of the parabola is expressed by the following equation (1), where the coordinates of the apex of the parabola are P (0, 0) and the coordinates of the focal point are F (a, 0).

[Math. 1]

$$y^2 = 4ax \quad (1)$$

Due to the mathematical properties of the parabola, when the light emitted from the sensor unit 30 is reflected by the reflecting surface 31a, the emission direction of the reflected light becomes parallel to the axis of the parabola regardless of the angle of the emitted light. That is, as shown in FIG. 3, in the optical path L1 and the optical path L2 having different emission angles from the sensor unit 30, the reflected lights on the reflecting surface 31a are parallel to each other. Thus, by disposing the sensor unit 30 at the focal point of the reflecting surface 31a, parallel scanning in which the optical path moves in parallel in the Y-axis direction according to the rotation of the emitted light is enabled.

The material of the parabolic reflector 31 may be, for example, an aluminum alloy containing aluminum as a main component. In this case, the reflecting surface 31a can be formed, for example, by smoothing the surface of the aluminum alloy by mirror polishing or plating.

The planar reflector 33 is a reflector having a reflecting surface 33a at least a part of which is a plane. The reflecting surface 33a is provided on the optical path of the reflected light on the reflecting surface 33a. As shown in FIGS. 3 and 4, the planar reflector 33 changes the direction of the light reflected by the reflecting surface 31a to a direction different from that in the XY plane. More specifically, the light reflected by the planar reflector 33 is substantially parallel to the Z direction, that is, a direction of the rotation axis u. The reflected light from the planar reflector 33 is emitted to the outside of the ranging device. Thus, the direction of the light emitted from the ranging sensor 3 is not limited to the direction parallel to the axis of the reflecting surface 31a.

The material of the planar reflector 33 may be, for example, an aluminum alloy containing aluminum as a main component, similarly to the parabolic reflector 31. In this case, the reflecting surface 33a of the planar reflector 33 may be formed by smoothing the same as the reflecting surface 31a, or may be formed by sticking an aluminum alloy plate having specular gloss to the base material.

Figure 5:
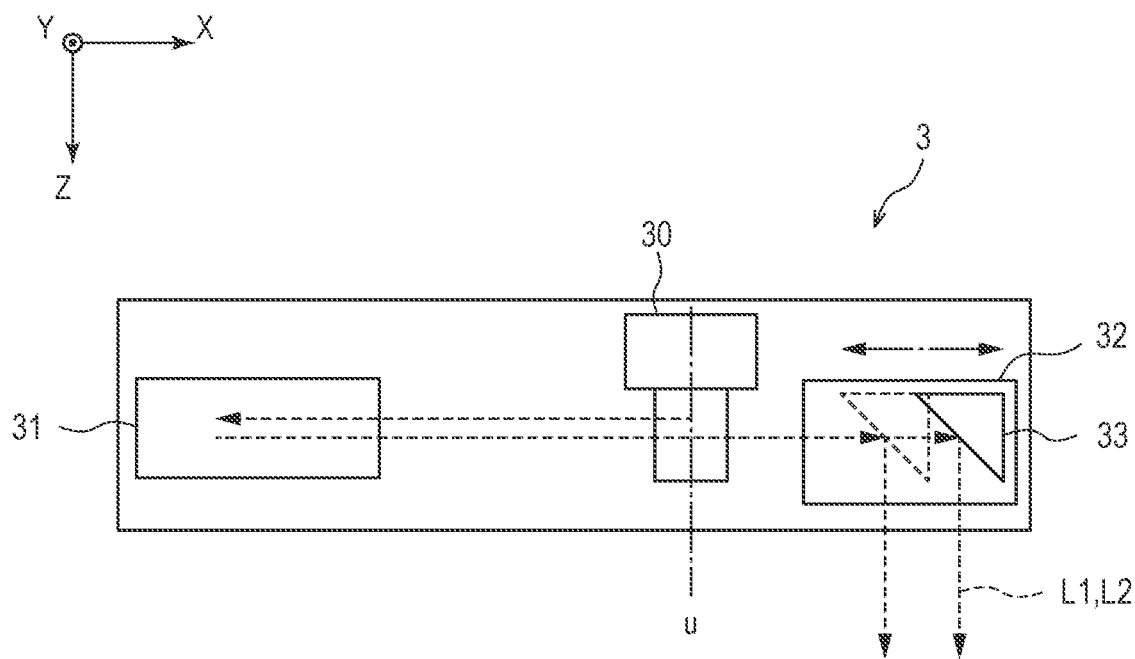
FIG. 5 is a schematic top view illustrating the ranging sensor according to a modified first example embodiment.

The driving mechanism 32 includes a motor or the like, and rotates the planar reflector 33 around a reflector rotating shaft 301. As shown in FIG. 5, the driving mechanism 32 may move the planar reflector 33 in the X direction. In this case, the ranging sensor 3 can scan the laser beam in parallel in each of the X direction and the Y direction. Thus, scanning with high accuracy can be performed without changing the resolution of scanning in the X direction and the Y direction regardless of the distance from the ranging sensor 3.

The optical paths L1 and L2 represent optical paths for light emitted from the sensor unit 30 to the outside. On the other hand, the light reflected by the object and incident on the ranging sensor 3 passes through the optical paths L1 and L2 in the reverse direction, and is detected by the sensor unit 30.

Figure 6:
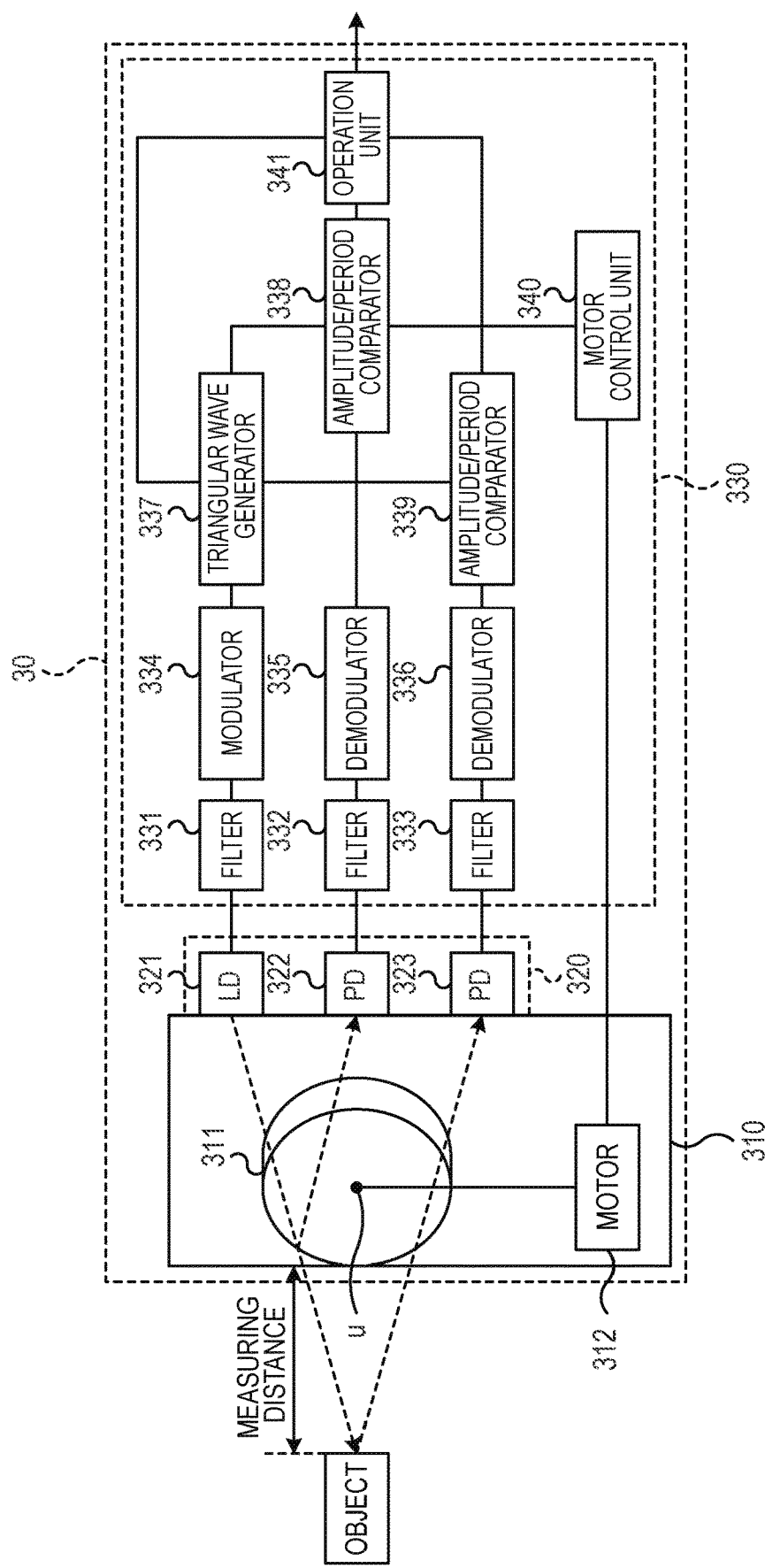
FIG. 6 is a block diagram of a sensor unit according to the first example embodiment.

FIG. 6 is a block diagram of the sensor unit according to the present example embodiment. The sensor unit 30 has a reflector unit 310, a laser unit 320, and a sensor control unit 330. The sensor control unit 330 controls the overall drive of the ranging sensor 3, and performs calculations such as generating signals and analyzing and correcting obtained signals. The laser unit 320 includes a light emitting element for projecting a laser beam, and a light receiving element for generating a signal by receiving the light reflected from the object for ranging. The reflector unit 310 has a function of scanning the laser beam projected from the ranging sensor 3 by changing the optical path of the laser beam projected from the laser unit 320.

The reflector unit 310 includes a reflector 311 and a motor 312. The laser unit 320 has an LD (Laser Diode) 321 and PDs (Photo Diodes) 322 and 323. The sensor control unit 330 includes filters 331, 332, 333, a modulator 334, demodulators 335, 336, a triangular wave generator 337, amplitude/period comparators 338, 339, a motor control unit 340, and an operation unit 341.

A triangular wave generator 337 generates a triangular wave whose voltage is repeatedly increased and decreased with time. The triangular wave generated by the triangular wave generator 337 is output to the modulator 334. The generated triangular wave is output to the amplitude/period comparators 338, 339 and the operation unit 341 as a reference signal for comparing the amplitude and the period.

The modulator 334 includes a VCO (Voltage-Controlled Oscillator) or the like, and generates a frequency-modulated wave according to the input voltage of the triangular wave generated by the triangular wave generator 337. The generated frequency modulation wave is input to the filter 331. The filter 331 is a band-pass filter having a pass band for the frequency of the frequency-modulated wave. The frequency-modulated wave passed through the filter 331 is input to the LD 321. The LD 321 is, for example, a light-emitting element for infrared communication, that emits a laser beam having a wavelength in a near-infrared region.

The laser beam emitted from the LD 321 enters the reflector unit 310. The reflector 311 in the reflector unit 310 reflects the incident laser beam and changes the direction in which the laser beam is projected. The motor 312 is, for example, a DC (Direct Current) motor with an encoder, and rotates the reflector 311 around the rotation axis u. The reflector 311 is driven to be rotated by the motor 312, so that the laser beam can be projected within a predetermined range. A part of the laser beam enters the PD 322 as reference light, and the other part is projected to the outside of the ranging sensor 3.

When the laser beam projected to the outside of the ranging sensor 3 is reflected by the object and enters the ranging sensor 3 again, the reflected light enters the PD 323.

Where the distance between the object and the ranging sensor 3 is the distance d, the reflected light has an optical path twice that is longer than an optical path of the reference light by the distance 2d, that is twice longer. Therefore, when the speed of light is c, the time at which the reflected light enters the PD 323 is 2d/c later than the time at which the reference light enters the PD 322.

The PDs 322 and 323 are, for example, photoelectric conversion elements for infrared communication, that receive light having a wavelength similar to that of the LD 321 and convert the light into electric charges. When light enters the PDs 322 and 323, a change in voltage based on the generated charge is input as an electric signal to the filters 332 and 333 in the subsequent stage. The filters 332 and 333 are band-pass filters having a pass band for the frequency of the frequency modulation wave generated by the triangular wave generator 337, similar to the filter 331. The frequency-modulated wave passed through the filter 332 is input to the demodulator 335. The frequency-modulated wave passed through the filter 333 is input to the demodulator 336.

Demodulators 335 and 336 include a PLL (phase-locked loop) or the like to demodulate the input frequency modulated wave. Since the frequency modulation wave is based on the triangular wave generated by the triangular wave generator 337, the signals demodulated by the demodulators 335 and 336 become triangular waves. The triangular wave obtained in the demodulator 335 is input to the amplitude/period comparator 338. The triangular wave obtained in the demodulator 336 is input to the amplitude/period comparator 339.

The amplitude/period comparators 338 and 339 include a mixer or the like for generating beat signals. The amplitude/period comparator 339 compares the amplitude/period of the triangular wave output from the triangular wave generator 337 with the amplitude/period of the triangular wave output from the demodulator 336. The comparison result by the amplitude/period comparator 339 is output to the operation unit 341. The amplitude/period comparator 338 compares the amplitude/period of the triangular wave output from the triangular wave generator 337 with the amplitude/period of the triangular wave output from the demodulator 335. The comparison result by the amplitude/period comparator 338 is output to the operation unit 341. The comparison result may be a difference or ratio between the amplitudes and periods of the two input signals.

An operation unit 341 performs operation for correcting the signal based on the reflected light output from the amplitude/period comparator 339 by using the signal based on the reference light output from the amplitude/period comparator 338 and the triangular wave output from the triangular wave generator 337. Thus, the operation unit 341 calculates the intensity of the reflected light, the distance between the ranging sensor 3 and the object, and the instantaneous speed of the object. The ranging sensor 3 measures the intensity of the reflected light, distance, and instantaneous velocity by scanning the laser beam within a predetermined range, and outputs these as a two-dimensional reflected light intensity distribution, distance, and instantaneous velocity distribution to an external image processing apparatus.

The information of the reference light output from the amplitude/period comparator 338 is also output to the motor control unit 340. The motor control unit 340 calculates the current position, rotation speed, etc., of the reflector 311 based on the information obtained from the amplitude/period comparator 338 and the information obtained from the encoder provided in the motor 312. The motor control unit 340 performs control to increase or decrease the rotational speed of the motor 312 based on information such as the current position and rotational speed of the reflector 311, thereby stabilizing the rotational speed of the reflector 311 to a predetermined value.

Some or all of the filters 331, 332, 333, modulator 334, demodulators 335, 336, triangular wave generator 337, amplitude/period comparators 338, 339, motor control unit 340, and operation unit 341 included in sensor control unit 330 may be arranged as an integrated circuit. Here, the integrated circuit may be an ASIC (Application Specific Integrated Circuit) or FPGA (Field Programmable Gate Array).

Figure 7:
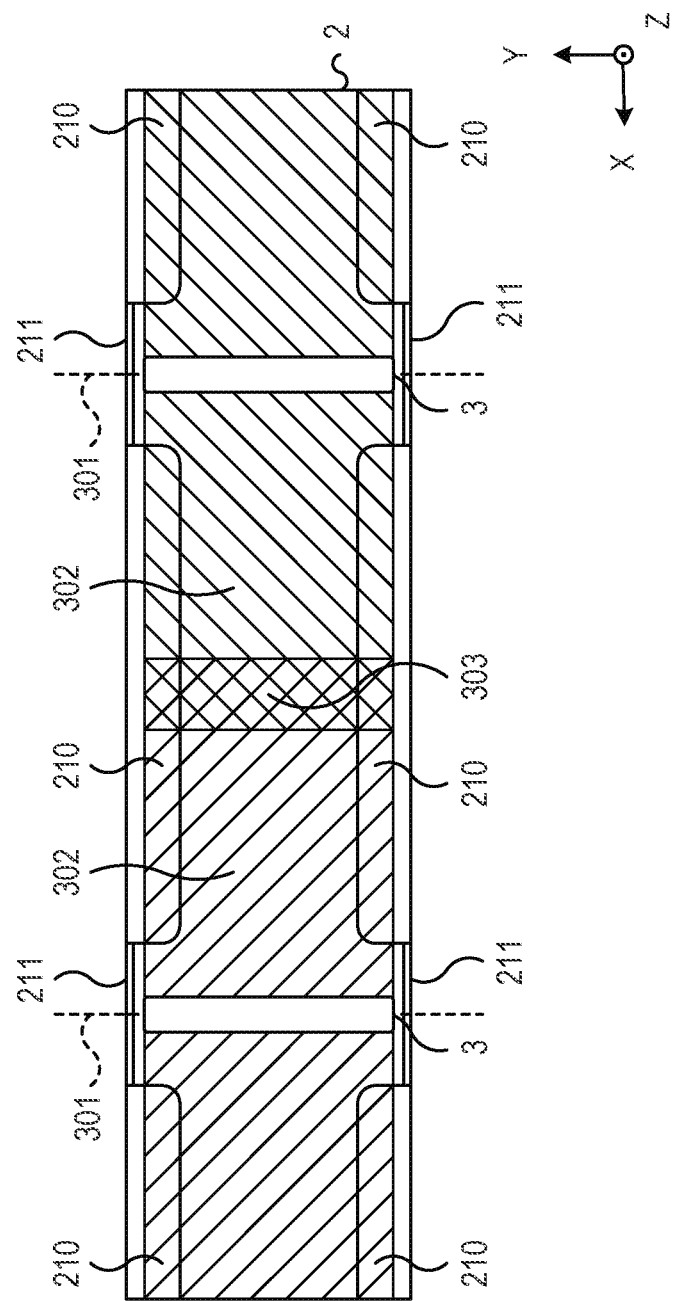
FIG. 7 is an example of an arrangement of ranging sensors according to the first example embodiment.

FIG. 7 is perspective view of the vehicle 2 that illustrates an example of an arrangement of ranging sensors. The longitudinal direction (traveling direction) of the vehicle 2 is the X direction, the lateral direction of the vehicle 2 is the Y direction, and the vertical direction to the ground plane of the vehicle 2 is the Z direction. The ranging sensors 3 are arranged at predetermined intervals in the vehicle 2, and are provided, for example, on a ceiling near the door 211. As shown in FIG. 4, the ranging sensor 3 includes a rotatable planar reflector 33, and the reflector rotating shaft 301 is arranged in parallel with the Y direction. Therefore, the internal space of the vehicle 2 is scanned along the X direction as the planar reflector 33 rotates. The length of the reflector rotating shaft 301, that is, the length of the scanning region 302 in the Y direction, is preferably close to the length of the vehicle 2 in the Y direction. Thus, it is possible to detect not only a passenger located near the passage or the door of the vehicle 2 but also a passenger on the seat 210. Further, it is preferable that the ranging sensors 3 are arranged such that a part 303 of the scanning region 302 of the two adjacent ranging sensors 3 in the vehicle 2 overlaps with each other. As described above, since the ranging sensor 3 is disposed, the internal space of the vehicle 2 can be scanned using a smaller number of ranging sensors 3.

In the case where the ranging sensor 3 includes the planar reflector 33 which can be moved in parallel as shown in FIG. 5, the movable range in the X direction of the planar reflector 33 corresponds to the scanning region 302. That is, when the planar reflector 33 moves in the X direction, the planar reflector 33 can scan the inside of the vehicle 2 in the X direction. Since the laser beam emitted from the ranging sensor 3 is always parallel to the Z direction, the resolution of scanning in the XY plane is constant. Therefore, the passenger can be scanned at a high resolution in the scanning region 302.

Figure 8:
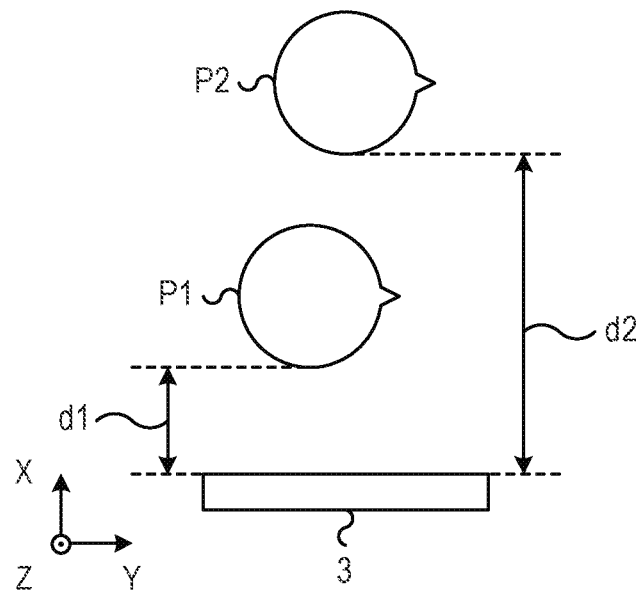
FIG. 8 is a diagram illustrating a processing of the control unit according to the first example embodiment.
Figure 9:
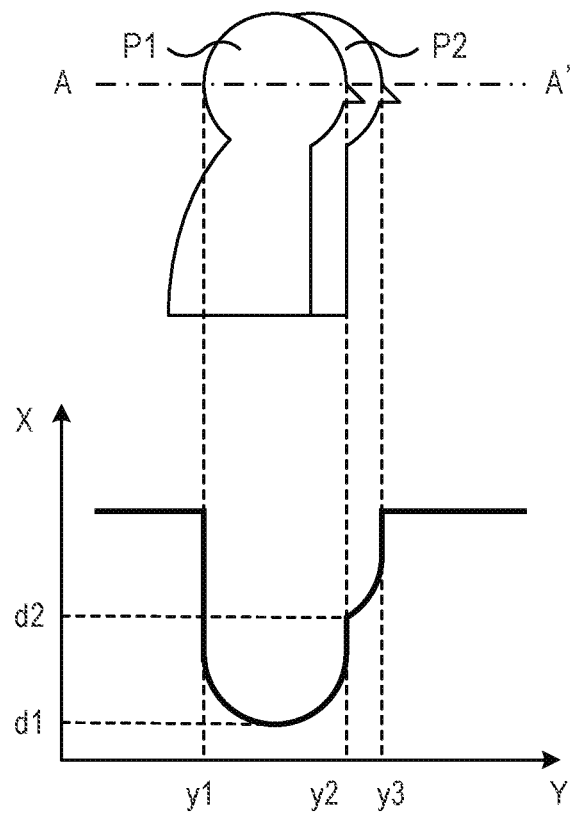
FIG. 9 is a diagram illustrating the processing of the control unit according to the first example embodiment.

FIGS. 8 and 9 are diagrams illustrating a processing of the control unit according to the present example embodiment for explaining the processing in the control unit. The distance information output from the ranging sensor 3 represents the distance value at each point of the scanning region 302 from the ranging sensor 3, and is information obtained by mapping the distance value to two-dimensional coordinates. Here, it is assumed that the passenger P1 is positioned in front of the passenger P2 with respect to the ranging sensor 3, and the passengers P1 and P2 overlap with each other when viewed from the ranging sensor 3. In the distance information from the ranging sensor 3, the distance values of the respective points of the passengers P1 and P2 are expressed in two-dimensional coordinates of the YZ plane. In the passengers P1 and P2, the distance values of the points on the line A-A' in the Y direction are shown in FIG. 9. In FIG. 9, the vertical axis represents a distance value in the X direction from the ranging sensor 3. When the passengers P1 and P2 overlap each other and the difference in luminance values between the passengers P1 and P2 is small, it is difficult to detect the passengers P1 and P2 separately by a two-dimensional sensor for obtaining a plane image. On the other hand, since the distance values are different between the passengers P1 and P2, the control unit 4 can correctly recognize the passengers P1 and P2 by referring to the distance values of the points included in the distance information. The control unit 4 uses, for example, an edge detection filter to extract the outline of an object such as a passenger, a handrail, a strap, or a seat, and generates the outline information. That is, the control unit 4 can calculate the differential operation value represented by the squared sum of the first derivatives in each of the coordinates in the Y direction and the Z direction of the distance information, and output the coordinates in which the differential operation value exceeds a predetermined threshold as the contour information.

In the distance information shown in FIG. 9, the distance values from the ranging sensor 3 to the passengers P1 and P2 are represented by d1 and d2, respectively, and the distance values rapidly change at the coordinates y1, y2 and y3 in the Y direction. By using an edge detection filter, contours at coordinates y1, y2, and y3 can be extracted. In particular, since the coordinate y2 of the boundary between the passenger P1 and the passenger P2 can be detected, the outline of the passengers P1 and P2 can be extracted as different persons.

The control unit 4 extracts the feature quantity from the distance information and the contour information. For example, the feature quantity of the passengers P1 and P2 can be extracted from the contour information of the passengers P1 and P2 and the distance information of each part of the passengers P1 and P2 such as head, eyes, nose, mouth, body, hands and feet. It is preferable that the extraction method of the feature quantity is the same as the extraction method of the feature quantity model generated in advance. For example, when the feature model is generated by using the high-order local autocorrelation, the control unit 4 extracts the feature quantity from the distance information and the contour information by a similar extraction method.

The control unit 4 performs pattern matching between the extracted feature quantity and the feature quantity model. Pattern matching may be performed, for example, based on quantitative evaluation values such as model coordinates, rotation angles, scales, etc., and the number of feature quantities that match the model. The control unit 4 recognizes the passengers by pattern matching, and can calculate the number of passengers by counting the recognized passengers. When a plurality of ranging sensors 3 are provided in the vehicle 2, a control unit 4 calculates the number of passengers for each ranging sensor 3 and outputs the total value of the number of passengers as the passengers of the vehicle 2. When two adjacent ranging sensors 3 scan the overlapping scanning region 302, there is a possibility that the same passenger is counted twice. In this case, the control unit 4 can obtain an accurate number of passengers by subtracting the number of passengers in the overlapping scanning region 302 from the total number of passengers.

Figure 10:
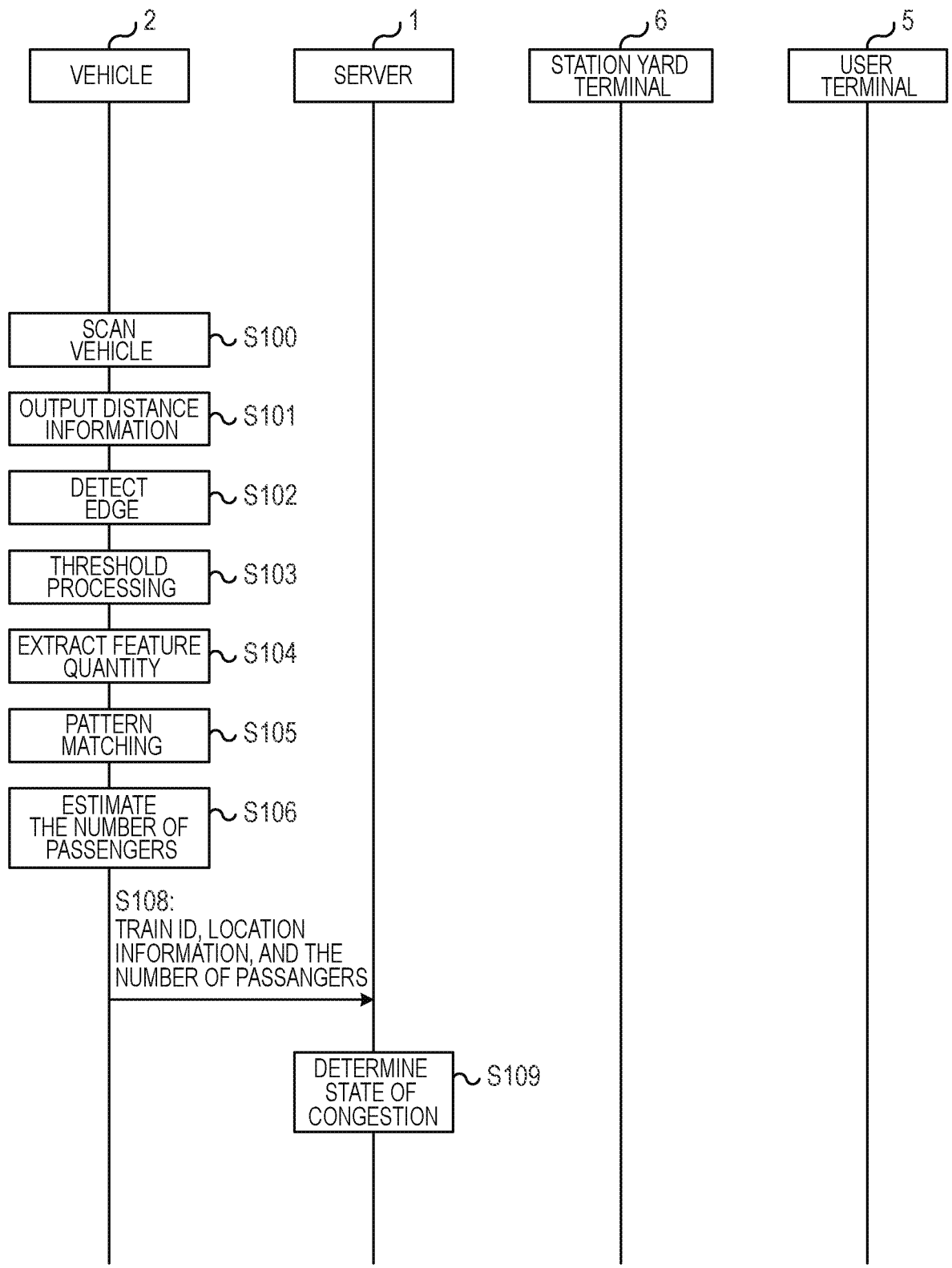
FIG. 10 is a sequence diagram illustrating a process of the passenger monitoring system according to the first example embodiment.
Figure 11:
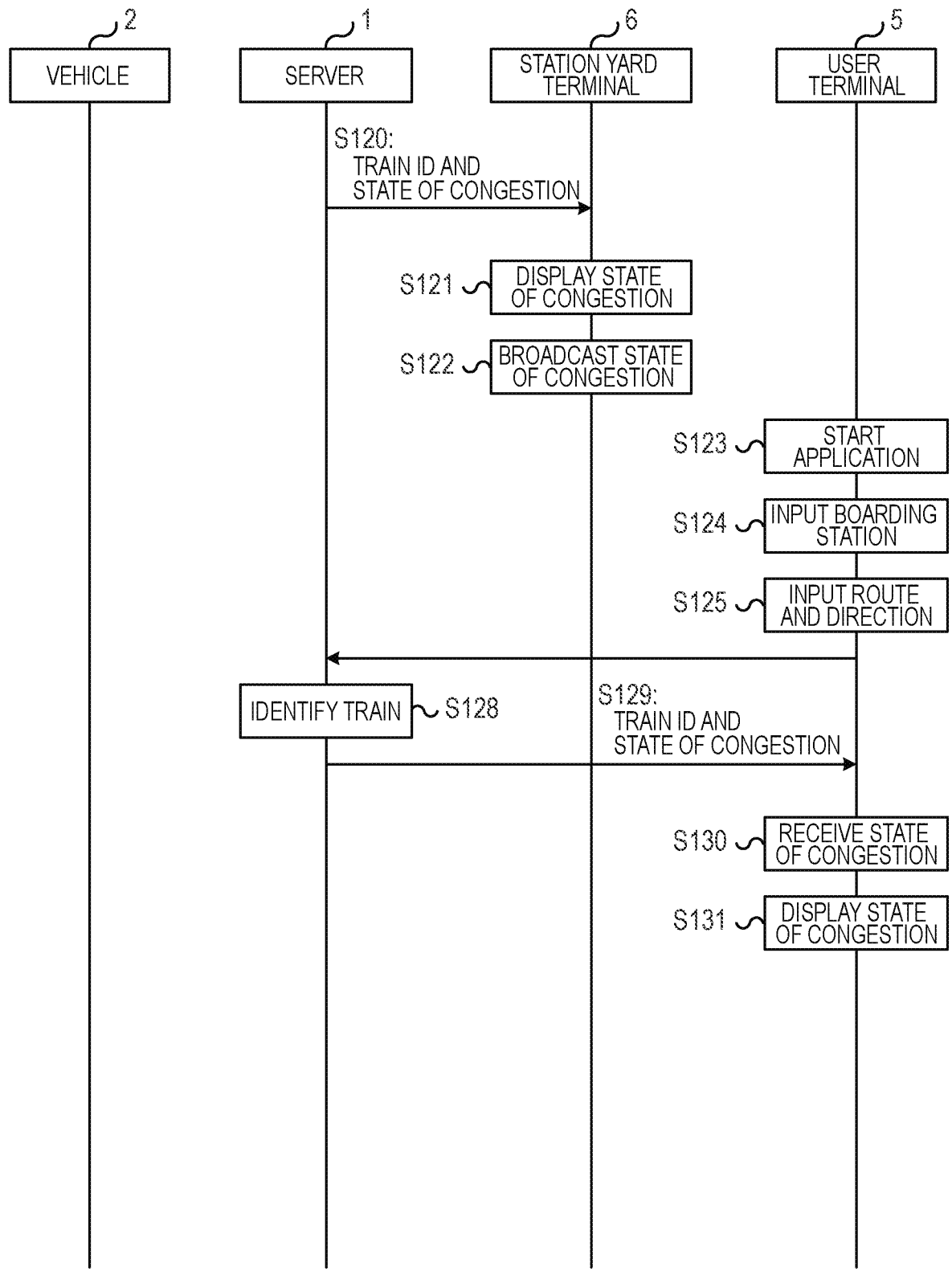
FIG. 11 is a sequence diagram illustrating the process of the passenger monitoring system according to the first example embodiment.

FIGS. 10 and 11 are sequence diagrams illustrating the process of the passenger monitoring system according to the present example embodiment. In FIG. 10, the ranging sensor 3 of the vehicle 2 scans the inside of the vehicle 2 while rotating the reflector rotating shaft 301 (step S100). The ranging sensor 3 transmits the distance information to the control unit 4 via the communication IF 44 (step S101). The ranging sensor 3 may sequentially transmit the distance information to the control unit 4 while scanning, or may collectively transmit the distance information after the scanning of the scanning region 302 is completed.

The control unit 4 of the vehicle 2 performs a differential operation using the edge detection filter in the distance information from the ranging sensor 3 (step S102). The control unit 4 extracts coordinates in which the differential operation value exceeds a predetermined threshold value as a contour, and generates contour information (step S103). Subsequently, the control unit 4 extracts a feature amount from the contour information and the distance information (step S104), and compares the extracted feature amount with a previously generated feature amount model to perform pattern matching (step S105). Further, the control unit 4 recognizes the passengers by pattern matching and estimates the number of passengers in the vehicle 2 (step S106). The control unit 4 transmits the number of passengers obtained from the above processes to the server 1 together with the train ID and the position information of the train (step S108). The distance information from the ranging sensor 3 may be transmitted to the server 1, and the server 1 may estimate the number of passengers.

The control unit 4 may repeat the processing of steps S101 to S106 at predetermined intervals. In this case, the control unit 4 averages the number of passengers by a plurality of scans performed by the ranging sensor 3, so that the number of passengers with a small error can be obtained. The control unit 4 may also obtain the number of passengers immediately after the boarding and exiting of the passengers are finished and the door 211 is closed. In this case, the number of times of calculating the number of passengers in the control unit 4 can be reduced, and the processing load of the control unit 4 can be reduced.

When the server 1 receives the distance information, the train ID, the position information and the number of passengers from the vehicle 2 (step S108), and determines the state of congestion (step S109). The state of congestion is an index representing the degree of congestion of each vehicle 2 in stages, and for example, the state of congestion may be represented by a message such as "not crowded", "slightly crowded", or "very crowded", or may be represented by a number or a symbol. The congestion may also be expressed as a ratio of the number of passengers to the number of passengers of the vehicle 2.

The server 1 identifies a station where the train is scheduled to arrive on the basis of the train operation schedule and the present time, and transmits the train ID and the state of congestion to a station yard terminal 6 installed at the station (step S120). The station yard terminal 6 displays the state of congestion of each vehicle 2 on a display 61 (step S121). For example, it is desirable to use a display in which the user can intuitively grasp the state of congestion, such as displaying the congested vehicle 2 in red and the vacant vehicle 2 in green. The station yard terminal 6 broadcasts the state of congestion with voice from the automatic voice device 62 (step S122). The automatic voice device 62 may notify only the crowded vehicle 2, for example. Thus, the user can get on the vehicle avoiding the crowded vehicle 2, and the automatic voice device 62 can shorten the time required for voice broadcasting.

Figure 12A:
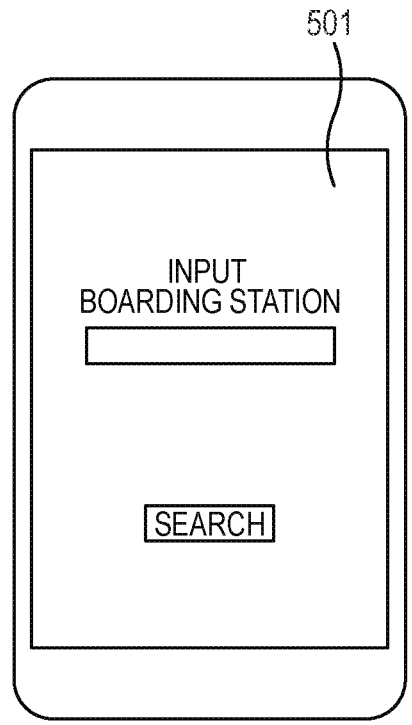
FIG. 12A is a diagram illustrating one example of a screen displayed on a user terminal according to the first example embodiment.
Figure 12B:
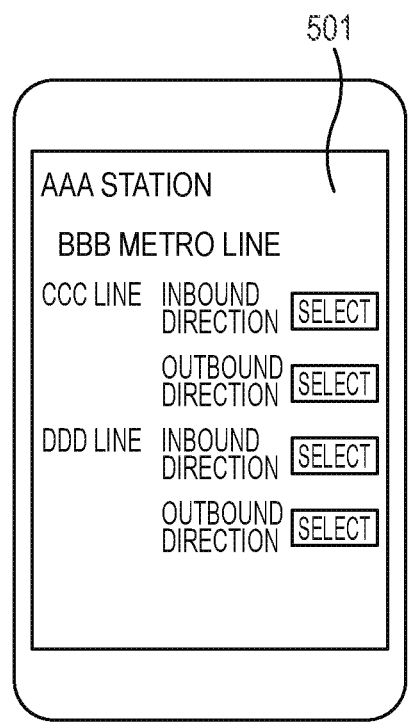

On the other hand, the user operates the user terminal 5 at a desired timing to start the application program previously downloaded to the user terminal 5 (step S123). When the user is waiting on the platform of the boarding station, the user can identify the train which can be boarded on the platform. For example, the display 55 of the user terminal 5 displays the input screen 501 shown in FIG. 12A, and the user inputs the boarding station on the input screen 501 (step S124). Subsequently, the display 55 of the user terminal 5 displays the route and destination available at the input boarding station. As shown in FIG. 12B, icons indicating the boarding station, route, up/down direction, and selection are displayed on the display 55. A user inputs a route and a direction by operating a selected icon on a display 55 (step S125), and a user terminal 5 transmits information indicating a boarding station, a route and a direction inputted by the user to a server 1. The user may input a desired arrival/departure time or arrival time to the user terminal 5.

Figure 12C:
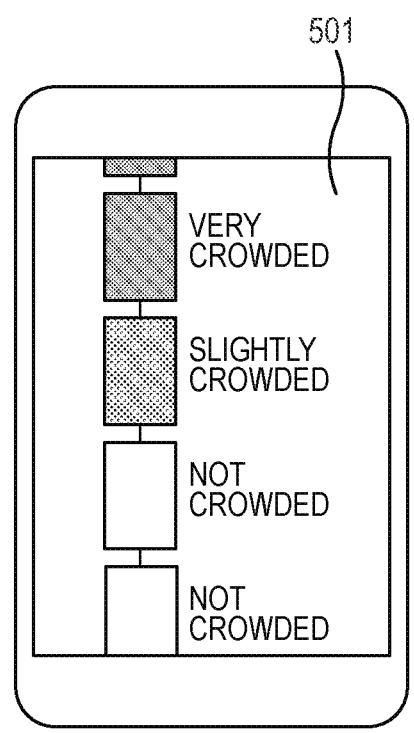

The server 1 identifies the train based on the information transmitted from the user terminal 5, the present time and the train operation schedule (step S128). The server 1 transmits the state of congestion of the identified train together with the train ID to the user terminal 5 (step S129). The user terminal 5 receives the state of congestion and the train ID (step S130), and displays the state of congestion of each vehicle 2 on a display 55 (step S131). As shown in FIG. 12 C, the user terminal 5 displays the congestion state of each vehicle 2 on the display 55. When the congestion state of all the vehicles 2 does not fit in one screen, the user can browse the state of congestion of the other vehicles 2 by scrolling up and down the screen. When the user is waiting for a train on the platform, the user can check the state of congestion of each vehicle 2 and ride avoiding the crowded vehicle 2. In addition to the state of congestion of the identified train, the server 1 may distribute the state of congestion of a plurality of trains before and after the identified train to the user terminal 5.

As described above, according to the present example embodiment, the state of congestion of the vehicle 2 can be accurately detected by using the distance information from the ranging sensor 3. Although the control unit 4 provided in the vehicle 2 detects the number of passengers in the present example embodiment, the server 1 may detect the number of passengers based on the distance information. The function of the server 1 may be realized in the operation management system 7.

Second Example Embodiment

Figure 13:
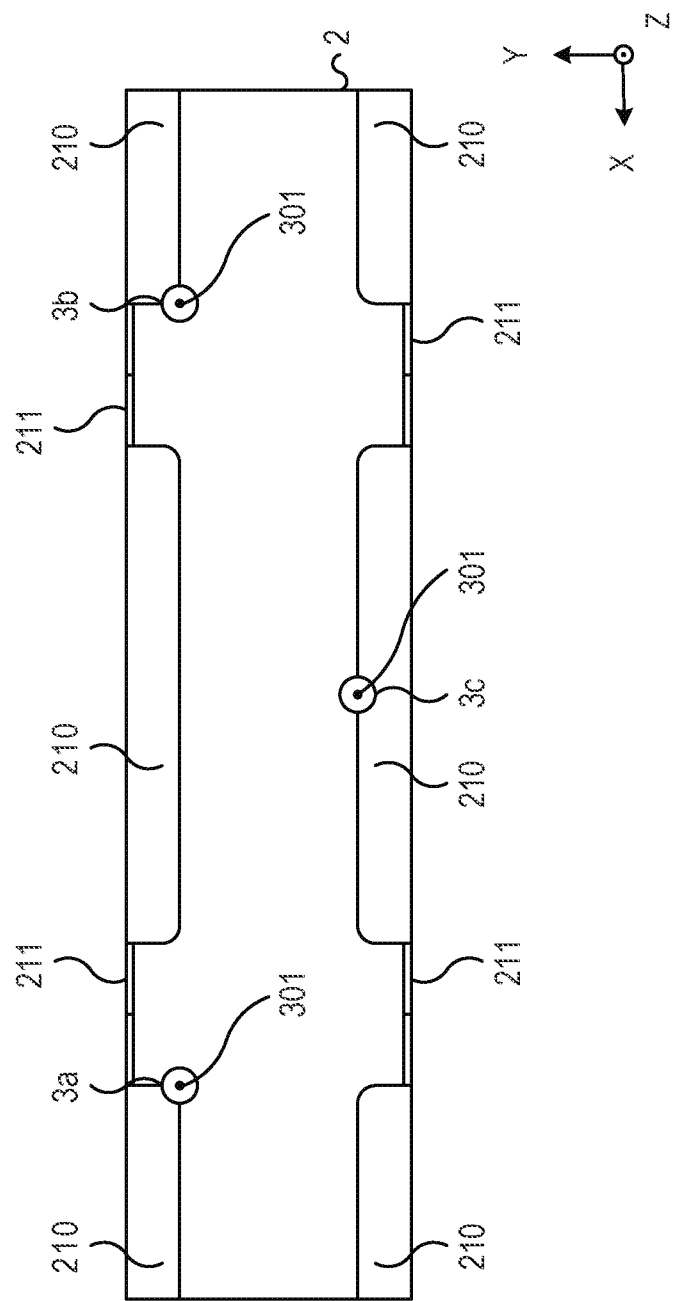
FIG. 13 is an example of an arrangement of ranging sensors according to a second example embodiment.

Next, a passenger monitoring system according to the second example embodiment will be described. FIG. 13 is plane perspective view of the vehicle 2 illustrating an example of the arrangement of the ranging sensors 3 in the present example embodiment. The present example embodiment is different from the first example embodiment in that the reflector rotating shaft 301 of the ranging sensor 3 is arranged perpendicular to the floor. Hereinafter, a configuration different from that of the first embodiment will be mainly described.

In FIG. 13, the reflector rotating shaft 301 of the ranging sensor 3 is arranged in parallel with the Z direction. The length of the reflector rotating shaft 301 in the Z direction is preferably sufficiently longer than the average height of the passenger. The length of the reflector rotating shaft 301 may be a length in the Z direction of the vehicle 2, that is, a length from the floor to the ceiling of the vehicle 2. With such a configuration, the ranging sensor 3 can scan many parts from the legs to the head of the passenger. The control unit 4 can identify the passenger by using distance information of each part of the passenger. For example, even if the head of one passenger is hidden behind the body of another passenger and is not detected by the ranging sensor 3, the legs or arms other than the head of the one passenger may be detected. In this case, the control unit 4 can identify two passengers based on the distance information of the scanned leg or arm.

In the example of FIG. 13, three ranging sensors 3a, 3b, and 3c are provided in the vehicle 2, the ranging sensors 3a and 3b are provided on one inner wall of the vehicle 2, and the ranging sensor 3c is provided on the other inner wall facing the one inner wall. The ranging sensors 3a and 3b are disposed at corners of the seat 210 near the door 211. The ranging sensor 3c is disposed at the center of the seat 210. Since the ranging sensor 3c is opposed to the ranging sensors 3a and 3b, the same passenger can be scanned from different directions. Further, the entire internal space of the vehicle 2 can be scanned using a small number of ranging sensors 3a, 3b, and 3c.

The control unit 4 estimates the number of passengers based on the distance information measured by the ranging sensor 3, and the server 1 can distribute the state of congestion based on the number of passengers to the user terminal 5. In the present example embodiment, as in the first example embodiment, the state of congestion of the vehicle 2 can be accurately detected by using the distance information from the ranging sensor 3.

Third Example Embodiment

Figure 14:
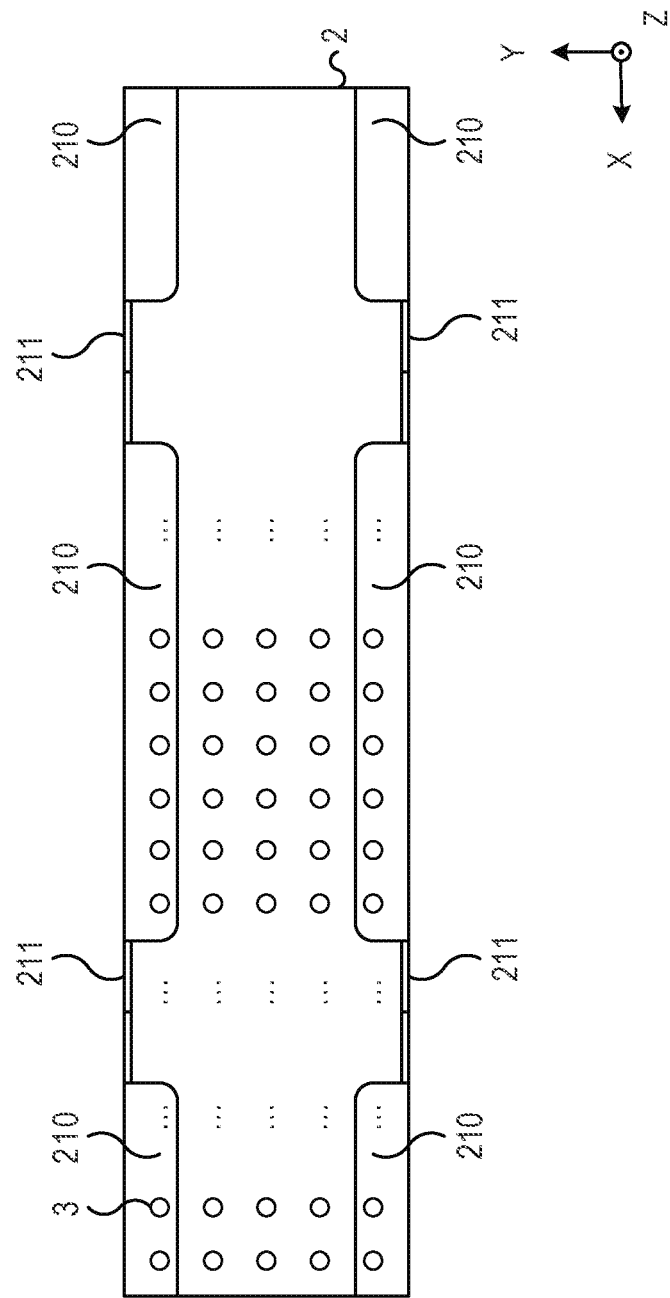
FIG. 14 is an example of an arrangement of ranging sensors according to a third example embodiment.

A passenger monitoring system according to a third example embodiment will be described. FIG. 14 is a plane perspective view of the vehicle 2 illustrating an example of the arrangement of the ranging sensors 3 in the present example embodiment. In the present example embodiment, the ranging sensor 3 includes MEMS (Micro Electro Mechanical Systems) as a reflector. Hereinafter, differences from the first and second example embodiments will be mainly described.

As compared with a reflector driven by a machine, the MEMS has a feature that the size is small while the movable angle is relatively narrow. In the present example embodiment, the ranging sensor 3 can be miniaturized by using the MEMS for the ranging sensor 3. In the present example embodiment, the plurality of ranging sensors 3 are arranged in an array on the ceiling of the vehicle 2. The ranging sensors 3 are preferably arranged on the entire ceiling. Thus, it is possible to detect passengers positioned near the door 211 of the vehicle 2, the seat 210, the passage, etc.

In the above configuration, the control unit 4 combines the distance information from the plurality of ranging sensors 3 and maps it to the respective coordinates of the XY plane. The control unit 4 recognizes the passengers on the basis of the mapped distance information and can estimate the number of passengers for each vehicle 2.

In the present example embodiment as well, by using the distance information from the ranging sensor 3, the state of congestion of the vehicle 2 can be accurately detected. Since a plurality of ranging sensors 3 are arranged in an array on the ceiling, laser light is irradiated from the ceiling of the vehicle 2 to the head of the passenger in the vertical direction. In comparison with the case of irradiating the laser beam from the side of the passenger, a plurality of passengers are less likely to be detected in overlap, and a more accurate number of passengers can be estimated.

Fourth Example Embodiment

Figure 15:
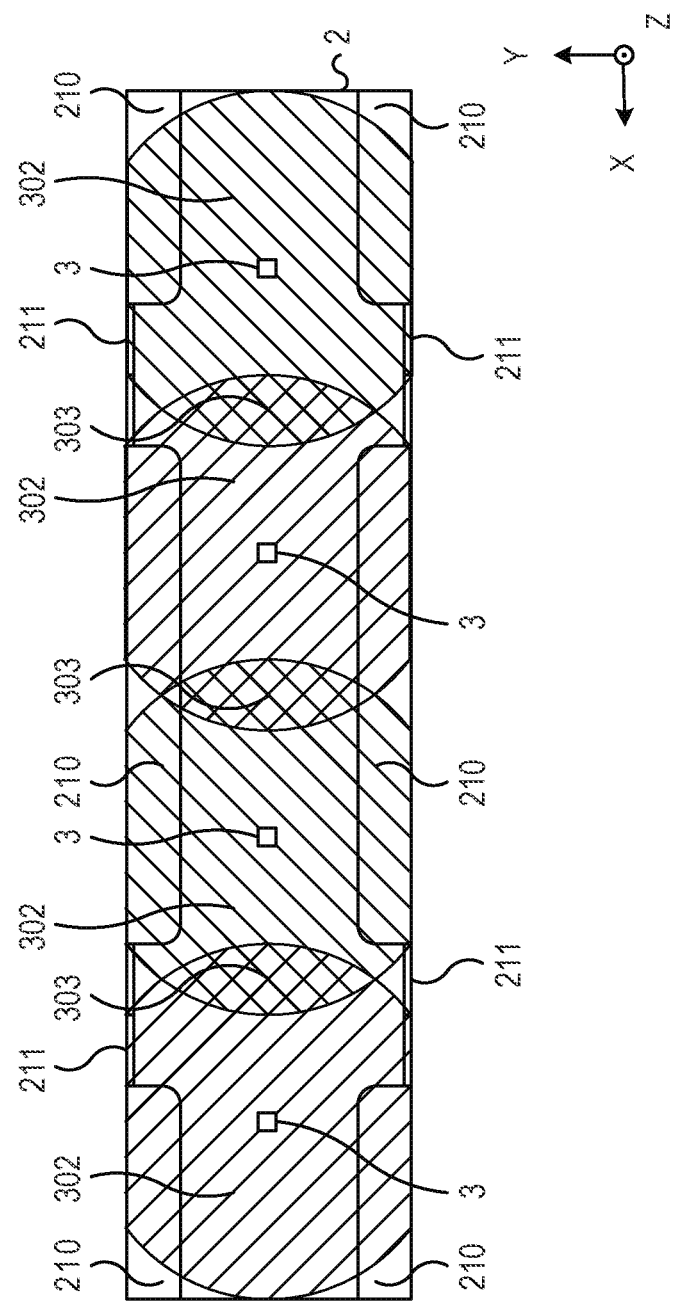
FIG. 15 is an example of an arrangement of ranging sensors according to a fourth example embodiment.

FIG. 15 is a plane perspective view of the vehicle 2 illustrating an example of the arrangement of the ranging sensor 3 in the present example embodiment. The passenger monitoring system of the present example embodiment differs from the first to third example embodiments in that the ranging sensor 3 is constituted by an image sensor having a TOF function. Hereinafter, differences from the first to third example embodiments will be mainly described.

The ranging sensor 3 according to the present example embodiment includes a CMOS (Complementary Metal Oxide Semiconductor) image sensor and a lens. The CMOS image sensor includes a plurality of pixels arranged in an array, and can acquire image information representing luminance and color of an object. Further, the CMOS sensor according to the present example embodiment has a TOF function, and can detect the time from the irradiation of light to the detection of reflected light in the pixel. That is, the ranging sensor 3 can detect image information representing luminance and color of an object in addition to distance information to the object.

In FIG. 15, the plurality of ranging sensors 3 are provided at equal intervals in the X direction of the vehicle 2 and at the center of the passage of the vehicle 2, that is, at the center in the Y direction. In addition, it is desirable that a part 303 of the scanning region 302 of the two adjacent ranging sensors 3 is overlapped and that there is no area that is not captured between the two scanning areas 302. With such a configuration, the number of passengers can be accurately estimated by detecting the passengers at all positions of the vehicle 2.

The control unit 4 can more accurately estimate the number of passengers by using image information in addition to distance information from the ranging sensor 3. For example, when two passengers are close to each other and the distance information of the two passengers is similar, the control unit 4 may distinguish the two passengers by referring to the information such as the color of the clothes of the passengers. According to the present example embodiment, the image information can also be used for monitoring in the vehicle 2. For example, the server 1 transmits the image information to the operation management system 7, so that the operator of the operation management system 7 can confirm the safety of the vehicle 2. Further, the server 1 may distribute the image information to the user terminal 5 and the station yard terminal 6 and provide the state of congestion to the user as a concrete image. In this case, in order to protect the privacy of the passenger, it is preferable to perform image processing such as reducing the resolution of the image.

Fifth Example Embodiment

Figure 16:
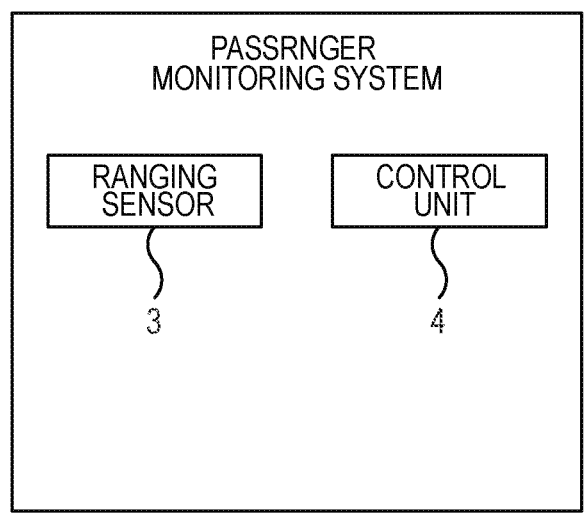
FIG. 16 is a schematic diagram illustrating a general configuration of the passenger monitoring system according to a fifth example embodiment.

FIG. 16 is a schematic diagram illustrating a general configuration of the passenger monitoring system in each of the above example embodiments. The passenger monitoring system includes a ranging sensor 3 provided in a vehicle 2 and capable of outputting distance information corresponding to the distance to a passenger in the vehicle 2, and a control unit 4 for estimating the state of congestion of the vehicle 2 based on the distance information. According to this configuration, the state of congestion of the vehicle 2 can be accurately detected.

Other Example Embodiment

In the above example embodiment, the congestion state of the vehicle is estimated by detecting a passenger, but the state of congestion of the vehicle may be estimated by detecting an empty space of the vehicle by a ranging sensor. That is, the distance to the passenger or the inner wall of the vehicle is measured by the ranging sensor, and the control unit can calculate the empty space of the vehicle by integrating the distance values. Here, the inner wall of the vehicle includes a member such as a floor, a ceiling, a window, and a door which form a space inside the vehicle. When the vehicle is empty, the measured distance value becomes long because the laser beam from the ranging sensor is reflected by the inner wall of the vehicle without being blocked by the passenger. On the other hand, when the vehicle is crowded, the measured distance value becomes short because the laser beam from the ranging sensor is reflected by the passenger positioned in front of the inner wall. That is, the smaller the vacant space of the vehicle is, the smaller the integrated value of the distance value becomes, and it can be determined that the vehicle is crowded.

Although the present invention has been described with reference to the example embodiments, the present invention is not limited to the example embodiments. The structure and details of the present invention may be modified in various ways that would be understood by those skilled in the art within the scope of the present invention.

The whole or part of the example embodiments disclosed above can be described as, but not limited to, the following supplementary notes.

(Supplementary Note 1)

A passenger monitoring system comprising: a ranging sensor that is provided in a vehicle and capable of outputting a distance information corresponding to a distance to a passenger in the vehicle; and a control unit that estimates a state of congestion of the vehicle based on the distance information.

(Supplementary Note 2)

The passenger monitoring system according to supplementary note 1, wherein the control unit distinguishes one passenger and other passengers based on a difference between a distance information of the one passenger and a distance information of the other passengers, and counts the number of passengers in the vehicle.

(Supplementary Note 3)

The passenger monitoring system according to supplementary note 2, wherein the control unit estimates the state of congestion based on the number of passengers.

(Supplementary Note 4)

The passenger monitoring system according to any one of supplementary notes 1 to 3, wherein the control unit estimates the state of congestion by integrating the distance information of the passenger and a distance information of an inner wall of the vehicle.

(Supplementary Note 5)

The passenger monitoring system according to any one of supplementary notes 1 to 3, wherein the ranging sensor includes a first ranging sensor that capable of scanning a first scanning region and a second ranging sensor that capable of scanning a second scanning region, wherein the first scanning region and the second scanning region include an overlapping area that overlaps each other, wherein the control unit counts the number of passengers in the vehicle by subtracting the number of passengers based on a distance information corresponding to the overlapping area from a sum of the number of passengers based on a distance information output from the first ranging sensor and the number of passengers based on a distance information output from the second ranging sensor.

(Supplementary Note 6)

The passenger monitoring system according to supplementary note 5, wherein the first ranging sensor is provided on one inner wall of the vehicle and the second ranging sensor is provided on another inner wall opposite to the one inner wall.

(Supplementary Note 7)

The passenger monitoring system according to any one of supplementary notes 1 to 5, wherein the ranging sensor output the distance information based on a time from when a measurement light is irradiated to when the measurement light is reflected by an object and received by the ranging sensor.

(Supplementary Note 8)

The passenger monitoring system according to supplementary note 7, wherein the ranging sensor causes the measurement light to be irradiated perpendicular to a floor of the vehicle to scan a space inside the vehicle.

(Supplementary Note 9)

The passenger monitoring system according to any one of supplementary notes 1 to 8, wherein the passenger monitoring system is capable of distributing the state of congestion to a mobile terminal.

(Supplementary Note 10)

A passenger monitoring method comprising: obtaining step to obtain a distance information corresponding to a distance to a passenger in a vehicle from a ranging sensor provided in the vehicle; and estimating step to estimate a state of congestion of the vehicle based on the distance information.

This application is based upon and claims the benefit of priority from Japanese Patent Application No. 2018-217053, filed on Nov. 20, 2018, the disclosure of which is incorporated herein in its entirety by reference.

REFERENCE SIGNS LIST 1 server
11 CPU
12 memory
13 storage device
14 communication IF
2 vehicle
210 seat
211 door
3 ranging sensor
30 sensor unit
31 parabolic reflector
31a reflecting surface
32 driving mechanism
33 planar reflector
33a reflecting surface
301 reflector rotating shaft
310 reflector unit
311 reflector
312 motor
320 laser unit
321 LD
322 PD
323 PD
330 sensor control unit
331 filter
332 filter
333 filter
334 modulator
335 demodulator
336 demodulator
337 triangular wave generator
338 amplitude/period comparator
339 amplitude/period comparator
340 motor control unit
341 operation unit
4 control unit
41 CPU
42 memory
43 storage device
44 communication IF
45 image processing circuit
46 wireless WAN
47 GPS
48 display
5 user terminal
51 touch sensor
52 CPU
53 memory
54 storage device
55 display
56 communication IF
57 wireless LAN
6 station yard terminal
61 display
62 automatic voice device
7 operation management system
8 network

What is claimed is:

1. A passenger monitoring system comprising:
a ranging sensor that is provided in a vehicle and capable of outputting a distance information corresponding to a distance to a passenger in the vehicle;
a processor; and
a memory storing instructions executable by the processor to estimate a state of congestion of the vehicle based on the distance information,
wherein the ranging sensor includes a first ranging sensor to scan a first scanning region and a second ranging sensor to scan a second scanning region,
wherein the first scanning region and the second scanning region include an overlapping area at which the first scanning region and the second scanning region overlap,
wherein the instructions are executable by the processor to count a number of the passengers in the vehicle by subtracting the number of the passengers based on distance information corresponding to the overlapping area from a sum of the number of the passengers based on distance information output from the first ranging sensor and the number of the passengers based on distance information output from the second ranging sensor.

2. The passenger monitoring system according to claim 1, wherein the instructions are executable by the processor to distinguish one passenger from other passengers based on a difference between distance information of the one passenger and distance information of the other passengers.

3. The passenger monitoring system according to claim 2, wherein the instructions are executable by the processor to estimate the state of congestion based on the number of the passengers.

4. The passenger monitoring system according to claim 1, wherein the control unit estimates the state of congestion by integrating the distance information of the passenger and a distance information of an inner wall of the vehicle.

5. The passenger monitoring system according to claim 1, wherein the first ranging sensor is provided on one inner wall of the vehicle and the second ranging sensor is provided on another inner wall opposite to the one inner wall.

6. The passenger monitoring system according to claim 1,
wherein the ranging sensor outputs the distance information based on a time from when a measurement light is irradiated to when the measurement light is reflected by an object and received by the ranging sensor.

7. The passenger monitoring system according to claim 6,
wherein the ranging sensor causes the measurement light to be irradiated perpendicular to a floor of the vehicle to scan a space inside the vehicle.

8. The passenger monitoring system according to claim 1,
wherein the passenger monitoring system is to distribute the state of congestion to a mobile terminal.

9. A passenger monitoring method comprising:
obtaining, by a processor, a distance information corresponding to a distance to a passenger in a vehicle from a ranging sensor provided in the vehicle,
wherein the ranging sensor includes a first ranging sensor to scan a first scanning region and a second ranging sensor to scan a second scanning region,
wherein the first scanning region and the second scanning region include an overlapping area at which the first scanning region and the second scanning region overlap;
estimating, by the processor, a state of congestion of the vehicle based on the distance information; and
counting, by the processor, a number of the passengers in the vehicle by subtracting the number of the passengers based on distance information corresponding to the overlapping area from a sum of the number of the passengers based on distance information output from the first ranging sensor and the number of the passengers based on distance information output from the second ranging sensor.

* * * * *